United States Patent
de Jong et al.

(10) Patent No.: US 10,657,595 B2
(45) Date of Patent: May 19, 2020

(54) METHOD OF TOKENIZATION OF ASSET-BACKED DIGITAL ASSETS

(71) Applicant: Responsible Gold Operations Ltd., Houston, TX (US)

(72) Inventors: Brent William de Jong, Houston, TX (US); Fernando Daniel Goldstein, Sunnyvale, CA (US); Stephen Henry Grinalds, San Francisco, CA (US)

(73) Assignee: RESPONSIBLE GOLD OPERATIONS LTD., Houston, TX (US)

( * ) Notice: Subject to any disclaimer, the term of this patent is extended or adjusted under 35 U.S.C. 154(b) by 0 days.

(21) Appl. No.: 15/976,763

(22) Filed: May 10, 2018

(65) Prior Publication Data

US 2019/0130483 A1 May 2, 2019

Related U.S. Application Data

(60) Provisional application No. 62/504,386, filed on May 10, 2017.

(51) Int. Cl.
| | | |
|---|---|---|
| *G06Q 40/04* | (2012.01) | |
| *G06Q 20/40* | (2012.01) | |
| *G06Q 20/38* | (2012.01) | |
| *G06Q 20/02* | (2012.01) | |
| *H04L 9/08* | (2006.01) | |
| *H04L 9/32* | (2006.01) | |

(52) U.S. Cl.
CPC .............. *G06Q 40/04* (2013.01); *G06Q 20/02* (2013.01); *G06Q 20/382* (2013.01); *G06Q 20/389* (2013.01); *G06Q 20/40* (2013.01); *G06Q 20/401* (2013.01); *H04L 9/0897* (2013.01); *H04L 9/3213* (2013.01); *H04L 9/3247* (2013.01); *G06Q 2220/00* (2013.01); *H04L 2209/56* (2013.01)

(58) Field of Classification Search
CPC ............................ G06Q 40/04; G06Q 20/389
See application file for complete search history.

(56) References Cited

U.S. PATENT DOCUMENTS

| | | |
|---|---|---|
| 8,326,720 B2 | 12/2012 | Spirgel et al. |
| 8,626,641 B1 | 1/2014 | Merk |

(Continued)

FOREIGN PATENT DOCUMENTS

WO 2018165472 A1 9/2018

OTHER PUBLICATIONS

Norta, Alex, "Creation of Smart-Contracting Collaborations for Decentralized Autonomous Organizations," International Conference on Business Informatics Research, Aug. 18, 2015, all pages. (Year: 2015).*

(Continued)

*Primary Examiner* — Jacob C. Coppola
(74) *Attorney, Agent, or Firm* — Perkins Coie, LLP

(57) ABSTRACT

A system and method for issuing, managing, and transferring asset-backed asset tokens is provided. The system comprises a mint component and a commerce component. The commerce component provides an interface through which customers can purchase asset tokens. The commerce component interfaces with the mint component to control the issuance of the asset tokens in the name of the purchasing customers.

6 Claims, 8 Drawing Sheets

(56) References Cited

U.S. PATENT DOCUMENTS

| | | | | |
|---|---|---|---|---|
| 9,747,586 | B1* | 8/2017 | Frolov | G06Q 20/0655 |
| 2014/0052602 | A1 | 2/2014 | Spirgel et al. | |
| 2016/0092988 | A1* | 3/2016 | Letourneau | G06Q 40/06 705/66 |
| 2016/0260169 | A1* | 9/2016 | Arnold | G06Q 40/12 |
| 2016/0328705 | A1* | 11/2016 | Sebag | G06Q 20/381 |
| 2017/0024818 | A1 | 1/2017 | Wager et al. | |
| 2017/0046664 | A1* | 2/2017 | Haldenby | G06Q 20/0655 |
| 2017/0091756 | A1* | 3/2017 | Stern | H04L 9/3236 |
| 2017/0098291 | A1* | 4/2017 | Code | G06Q 40/02 |
| 2017/0213210 | A1* | 7/2017 | Kravitz | G06Q 20/3829 |
| 2017/0353309 | A1* | 12/2017 | Gray | G06F 21/53 |
| 2018/0068359 | A1* | 3/2018 | Preston | G06Q 30/0283 |
| 2018/0139043 | A1* | 5/2018 | Jayachandran | G06Q 20/065 |
| 2018/0204190 | A1 | 7/2018 | Moy et al. | |
| 2018/0240191 | A1 | 8/2018 | Aronson | |
| 2019/0130483 | A1* | 5/2019 | de Jong | G06Q 20/02 |
| 2019/0347725 | A1* | 11/2019 | de Jong | H04L 9/3213 |

OTHER PUBLICATIONS

"The Digital Asset Platform Non-technical White Paper," Digital Asset Holdings, LLC, all pages. (Year: 2016).*

Szabo, Nick, "Formalizing and Securing Relationships on Public Networks," First Monday, 1997, all pages. (Year: 1997).*

Buterin, Vitalik, "A Next Generation Smart Contract & Decentralized Application Platform," ethereum.org, all pages. (Year: 2014).*

Molina-Jimenez et al., "A Model for Checking Contractual Compliance of Business Interactions," IEEE Transactions and Services Computing, vol. 5, No. 2, 2012, all pages. (Year: 2012).*

Konstantinos et al., "Blockchains and Smart Contracts for the Internet of Things," IEEE Access, all pages. (Year: 2016).*

International Searching Authority, "The International Search Report and the Written Opinion of the International Searching Authority," PCT/US2018/03216, dated Jul. 30, 2018., 10 pages.

International Searching Authority, "The International Search Report and the Written Opinion of the International Searching Authority," PCT/US2018/032165, dated Jul. 30, 2018., 11 pages.

Eufemio, et al., "Digix's Whitepaper: The Gold Standard in Crypto-Assets," Jan. 1, 2016., 22 pages (incl. translation).

Anonymous, "ERC20 Token Standard," The Ethereum Wiki, Mar. 21, 2017., 6 pages.

Balta, et al., "'DinarDirham' Whitepaper," Jul. 3, 2016., 10 pages.

Nakamoto, "Bitcoin: A Peer-to-Peer Electronic Cash System," Oct. 31, 2008., 9 pages.

* cited by examiner

METHOD OF TOKENIZATION OF ASSET-BACKED DIGITAL ASSETS

CROSS-REFERENCE TO RELATED APPLICATION

This application claims the benefit of U.S. Provisional Application No. 62/504,386, filed on May 10, 2017, which is hereby incorporated by reference in its entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin is represented by a chain of transactions that transfers ownership from one party (the "sender") to another party (the "recipient"). Each transaction has an output, and each transaction (except for the initial creating of a bitcoin) has an input that is an output of a prior transaction. To transfer ownership of a bitcoin that is output by a prior transaction, a new transaction is generated and added to a stack of transactions in a block. The new transaction, which includes the public key of the new owner, is digitally signed by the current owner to transfer ownership to the new owner as represented by the new owner's public key. The current owner signs the new transaction by signing with the current owner's private key a hash of the prior transaction and the new owner's public key. The new transaction is considered to have "consumed" the output of the prior transaction. Once the block is considered to be complete, the block is "capped" with a block header that is a hash digest of all the transaction identifiers within the block. The block header is recorded as the first transaction in the next block in the chain, creating a chain of transaction blocks in which each block links back to the prior block, called a "blockchain." To verify that a proposed transaction is valid, the public key of the owner can be used to verify the signature, and the blockchain of transactions can be followed to verify that the prior transaction has not been consumed by another transaction. To prove ownership of the bitcoin of the new transaction, the new owner need only have the private key that matches the public key of the new transaction that transferred the bitcoin. The blockchain creates a mathematical proof of ownership in an entity represented by a security identity (e.g., a public key), which in the case of the bitcoin system is pseudo-anonymous.

The blockchain of the bitcoin system is stored as a distributed ledger. With the distributed ledger, a copy of the blockchain of all the transactions is stored redundantly at multiple nodes (i.e., computers) of a blockchain network. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique, referred to as mining, to generate a nonce that is added to the block when it is created. A bitcoin ledger is sometimes referred to as an Unspent Transaction Output ("UTXO") set because it tracks the output of all transactions that have not yet been spent. To facilitate determining whether the input to a transaction has been spent, a node may maintain an index into the blockchain that points to the unspent transactions.

Although the bitcoin system has been very successful, it is limited to transactions in bitcoins or other cryptocurrencies. Efforts are currently underway to use distributed ledgers to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its seral number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a distributed ledger establishes provenance of the asset, and the identity token can be used in transactions (e.g., buying, selling, insuring) of the asset stored in a distributed ledger, creating a full audit trail of the transactions.

To record a simple transaction in a distributed ledger, each party and asset involved with the transaction needs an account that is identified by a digital token in the network. For example, when one person wants to transfer a car to another person via a transaction, the current owner and next owner or recipient create accounts, and the current owner also creates an account that is uniquely identified by its vehicle identification number. The account for the car identifies the current owner. The current owner creates a transaction against the account for the car that indicates that the transaction is a transfer of ownership transfer, indicates the public keys (i.e., identity tokens) of the current owner and the next owner, and indicates the identity token of the car. The transaction is signed by the private key of the current owner and the transaction is evidence that the next owner is now the current owner.

To enable more complex transactions than bitcoin can support, some systems use "smart contracts." A smart contract is computer code that programmatically executes transactions that may be defined by a written contract or other pre-defined conditions. The computer code may be executed in a secure platform (e.g., an Ethereum platform, which provides a virtual machine) that supports recording transactions in a distributed ledger. In addition, the smart contract itself may be recorded as a transaction in the distributed ledger using an identity token that is a hash (i.e., identity token) of the computer code so that the computer code that is executed can be authenticated. When deployed, a constructor of the smart contract executes, initializing the smart contract and its state. The state of a smart contract is stored persistently in the distributed ledger. When a transaction is recorded against a smart contract, a message is sent to the smart contract, and the computer code of the smart contract executes to implement the transaction (e.g., debit a certain amount from the balance of an account). The computer code ensures that all the pre-defined conditions are met before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

DETAILED DESCRIPTION

Figure 1:
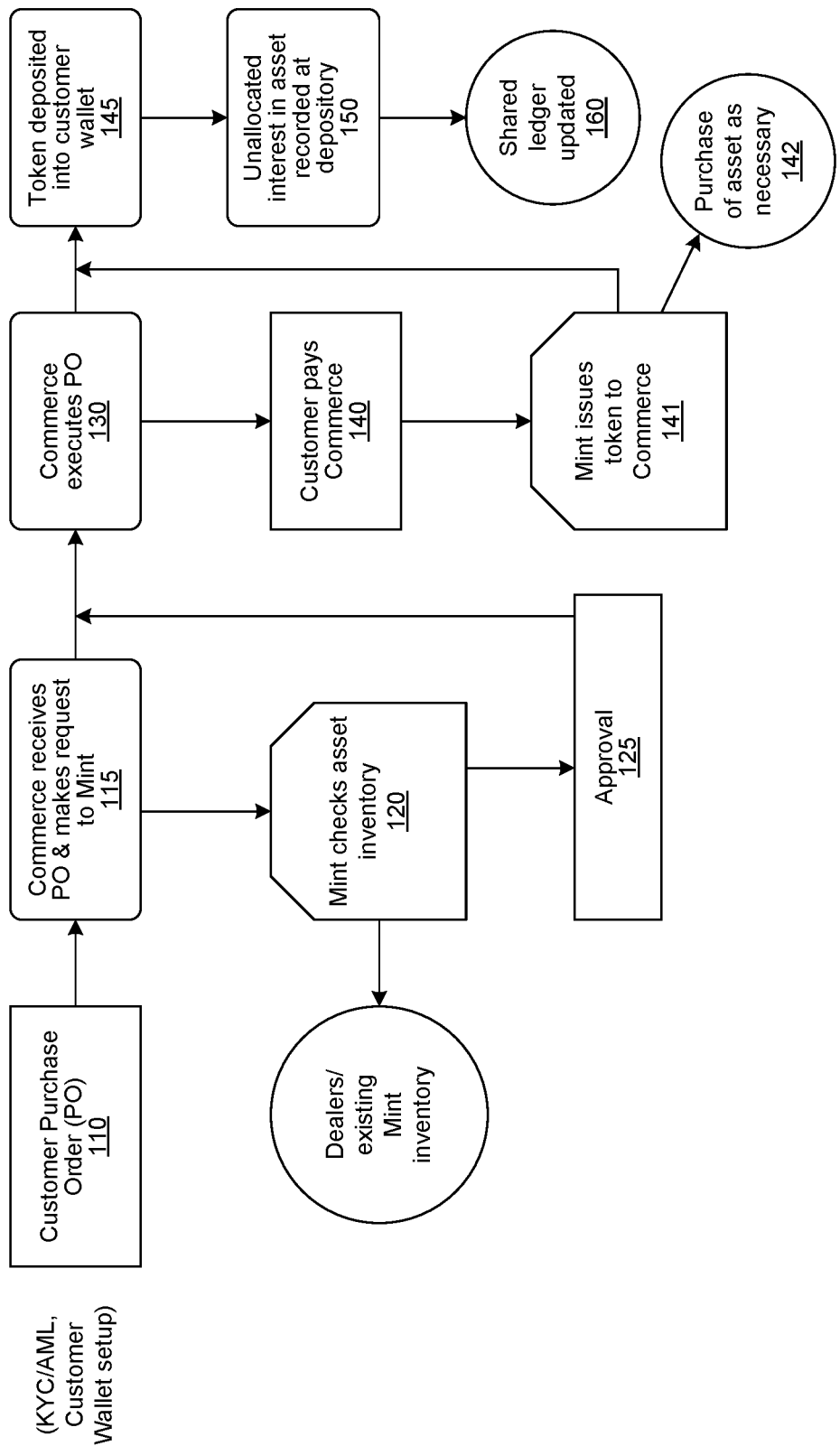
FIG. 1 is a block diagram that illustrates steps of the AT system for purchasing gold tokens.

A method and system that generates asset tokens, stores the asset tokens in a distributed ledger, and performs transactions against the asset tokens is provided. In some embodiments, an asset tokenization ("AT") system digitizes ownership interests in certain assets (e.g., gold or other commodities) to enhance access to the assets, enable tracking of assets based on their characteristics (e.g., conflict-free gold), and create efficiencies in supply chain management and trade finance. An asset token is a token that is backed by an underlying asset (e.g., refined gold or dore). The asset tokens thus may be used as a medium of exchange and can be used as an alternative to fiat currencies. The AT system provides the computer infrastructure for creating of asset tokens, purchasing of asset tokens, redeeming of asset tokens, transferring of ownership of asset tokens, and so on. As such, the AT system supports use of assets tokens in settlement, payments, international remittances, investments, financing, and other activities.

In some embodiments, the AT system includes an issuance component and a management component. The issuance component, under control of an issuance provider, issues asset tokens based on availability of supply or reserves of the asset in accordance with established procedures and exchanges for the asset. The management component, under control of a management provider, interfaces with the issuance component to request issuance of asset tokens, manage accounts of users (e.g., purchasers of asset tokens), request the transactions be performed on the asset tokens (e.g., transfer and redeem an asset token), and so on. The issuance provider and the management provider may be different organizations or the same organization. The AT system may also include a dealer component that under control of a dealer provider, coordinates the providing of assets that back the asset tokens. The AT system records the asset tokens in a distributed ledger. Each asset token may be associated with a standardized smart contract that specifies transactions that can be performed on the asset. In addition, the components may be implemented as off-chain smart contracts or may be implemented as independent subsystems that interface with, but are not part of, the distributed ledger.

In some embodiments, an implementation of the issuance component, referred to as the "mint" component, coordinates the process for the creation and issuance of gold tokens, that is, asset tokens that are backed by gold, such as gold coins or dore. An implementation of the management component, referred to as a commerce component, may include various commerce sub-components for each jurisdiction in which the AT system is used to comply with the laws and regulations of each jurisdiction. The commerce component distributes and manages gold tokens, provides an interface for users (e.g., gold token owners) of the AT system, and so on. The mint component and the commerce component may be under control of a single organization or provider or under control of separate organizations or providers. Although the AT system may be used with any type of physical asset (e.g., commodity), the AT system is described primarily in the context of an asset that is gold. A "gold token" may be backed by gold coins held in a depository and may be referred to as a "gold coin token." A "gold token" may also be backed by gold bars or dore bars and may be referred to as a "gold bar token" or "dore token."

In some embodiments, the AT system creates and issues gold tokens and stores the gold tokens in one or more shared, and eventually interoperable, ledgers (collectively referred to as the "shared ledger") so that the gold tokens can be widely distributed and transferred using the shared ledger. The shared ledger may be a public or permissioned (e.g., private or semi-private) distributed ledger. The shared ledger may globally replicate on all nodes all transactions performed by the AT system or may replicate a transaction only on nodes involved in the transaction. Shared ledger, distributed ledger, or blockchain ledger technologies are publicly available from Openchain®, Chain®, Hyperledger®, MultiChain®, the R3 Consortium®, IMB®, and others.

In some embodiments, a gold token represents a digitized ownership interest in physical gold. The AT system allows gold tokens to be marketed and sold as an interest in a fixed weight of gold of a particular grade and quality (e.g., 99.99%). A gold token is an instrument that can be used to transfer ownership in the gold that backs the gold token. Although gold tokens may be issued in fixed weights, the AT system may support the dividing, transferring, spending, and retaining of smaller weights or fractions of a gold token. The owner of a gold token may have the right to obtain physical possession of the gold that backs the gold token (e.g., "redeem" the gold token delivered to the owner of the gold token). When a gold token is redeemed, the AT system records a redemption transaction in the shared ledger to indicate that the gold token has been extinguished.

In some embodiments, users (e.g., owners, purchasers, and sellers of gold tokens) interact directly with the commerce component, which in turn interacts with the mint component. The mint organization that operates the mint component may not hold a substantial inventory of gold tokens. Instead, the mint component may purchase gold and create gold tokens on a just-in-time basis whenever a user purchases a gold token by creating and storing gold tokens in the shared ledger. The commerce component may purchase the gold tokens from the mint component and then transfer its ownership of the gold tokens to its purchasing customers. Alternatively, the mint component may issue gold tokens in the name of the purchasing customers.

FIG. 1 is a block diagram that illustrates steps of the AT system for purchasing gold tokens. Initially, a customer submits 110 a purchase request (i.e., requesting a purchase transaction) for a gold token for a certain quantity and quality of gold specified in a purchase order. If the customer does not already have an account with the commerce component, the customer would need to establish an account. The customer may interface with a client-side component of the commerce component that may include a wallet that stores account information (e.g., a public and private key pair of the customer) and may store a "non-official" record of the gold tokens owned by the customer. The shared ledger is the "official" record of the ownership of all gold tokens. The purchase order may include the price that the customer is willing to pay, or the commerce component may provide an offer price to the customer for approval. Upon receiving the request for a purchase request, the commerce component validates the request and submits 115 a reserve request to the mint component. The mint component determines 120 whether it has the gold available in its inventory to fulfill the purchase order. If not, the mint component checks with various approved dealers of gold to determine whether they can supply the gold. The mint component marks the gold in the inventory or to be supplied by the dealer as reserved. The mint component then notifies 125 the commerce component of the approval. The commerce component then executes 130 the purchase order, receives 140 payment from the customer, and directs the mint component to issue or transfer the gold token in accordance with the purchase order. If the mint component does not have the gold in its inventory, it completes the purchase 142 of the gold from the dealer. The mint component then issues 141 the gold token backed by gold that was reserved for the purchase transaction and notifies the commerce component. The issuance may include recording the gold token in the shared ledger. Alternatively, the mint component may provide the gold token to the commerce component, which records the gold token in the shared ledger. The commerce component then notifies 145 the customer that the transaction is complete and updates the customer's wallet. If the customer purchased only a portion of the gold token, the commerce component performs 150-160 a transaction on the gold token to record its interest in the gold token.

In some embodiments, the commerce component monitors available gold token inventory, gold inventory, and dealer capacity and makes available to users the amount of gold tokens that are available for purchase. The mint component and the dealers may record their inventories and capacities in the shared ledger for monitoring by the commerce component. The purchase of a gold token is a transfer of ownership of a fully funded, corresponding interest in the underlying gold. The mint component purchases gold on a fully allocated basis, and the gold is, in turn, used to back each gold token.

In some embodiments, the AT system may require a purchaser to have been previously approved as a customer or user and have an existing account with the AT system. In some embodiments, before submitting a purchase order, a customer may need to be cleared under applicable know-your-customer ("KYC") and anti-money laundering ("AMU") regulations and create a digital wallet to reflect the customer's ownership interests in gold tokens. The purchase order submitted by a customer may be in any of a number of forms, including a standard smart contract, digital form, verified message, or e-mail. The purchase order may be recorded in a separate order ledger or in the shared ledger.

In some embodiments, the mint component and the commerce component communicate with each other through various transactions. For example, the commerce component may submit to the mint component transaction requests to reserve, issue, and redeem gold tokens. When a gold token purchase order is submitted to the commerce component, the commerce component may request confirmation from the mint component that gold inventory of the requisite specified quantity and quality is available to back the gold token to be issued, effectively reserving the gold. Such inventory will either be available for purchase from dealers or already owned by the mint organization and allocated to an account of the mint organization at a gold depository. When such confirmation is received, the commerce component will execute the purchase order. Communications between the mint component and the commerce component may be written to a shared ledger and may take the form of smart contracts, transactions in a distributed ledger, secure messages, e-mail, or any other form.

In some embodiments, although the mint organization may have sufficient physical gold to back the requested purchase, the actual gold token would not be issued to the customer until the commerce component confirms payment by the customer. In this manner, the mint component may create a gold token and issue it to the commerce organization, but the gold token may not yet be issued to the customer. In a different embodiment, upon execution of the purchase order, the customer will pay the commerce organization, and the commerce component will instruct the mint component to issue the gold token. Upon receipt of the instructions from the commerce component, the newly minted gold token may be sent from the mint component to the commerce component. In some embodiments, the issuance of a gold token does not need to be conditioned on the mint organization's receipt of funds from the commerce organization.

In some embodiments, upon receipt of a purchase request for a gold token, the mint organization may not have sufficient inventory of gold to back the requested gold token. In such situations, the mint component facilitates the simultaneous purchase of gold as necessary. For example, if the mint organization does not already own a sufficient inventory of allocated gold to back the issuance of the gold token, then it will purchase the gold in the requisite quantity and quality through a qualified dealer. The mint component coordinates this purchase simultaneously with its issuance of the gold token. The gold that backs each gold token is transferred to an allocated account in the mint organization's name at a depository with the ownership of the gold token backed by the gold subsequently recorded in the shared ledger. Upon receipt of the issued gold token, the commerce component updates the customer's wallet. The commerce component may transfer some of the proceeds of the customer's payment to the mint organization, which may transmit some of the proceeds to the dealer as necessary In some embodiments, the owner of a gold token may transfer the gold token, or fractions thereof, to any third party that is a customer of the commerce organization. For example, the owner may request the smart contract for a gold token to perform a transfer transaction. The smart contract validates the transaction (e.g., ensuring that the requester owns the gold token and that the new owner is a customer). The smart contract then records the transaction in the shared ledger.

In some embodiments, the gold underlying a gold token is stored in a depository. The mint organization, the commerce organization, and the owner would enter into agreements with the depository pursuant to which (1) the depository agrees to treat the shared ledger as its own registry of ownership, i.e., for purposes of identifying a gold token owner as having title to the gold that backs the gold token, and (2) the gold token owners are generally provided with the clear right to withdraw the underlying gold upon "digital presentment" of a gold token to the depository. The AT system also allows owners to spend gold tokens to purchase goods and services on a retail basis, make P2P payments and remittances, and conduct other transactions.

In some example embodiments, gold tokens will be available for purchase by natural persons and entities without regard to whether the persons or entities own a minimum level of assets or discretionary investments. Such gold token owners are referred to as "retail" owners. Gold tokens will also be available for purchase by institutional market participants, such as banks and other financial institutions. Such gold token owners are referred to as "institutional" owners.

Although the AT system is described primarily in the context of a gold coin token, the AT system can be used to support transactions in gold bar tokens backed by gold bars and dore tokens backed by gold dore bars. A gold bar token is backed by a gold bar and dore tokens are backed by a gold dore bar of a certain quality, a certain quantity, and other characteristics (e.g., conflict-free gold) that may be uniquely identified by a serial number. The serial number may identify the refinery that created the gold bar or the mine at which the gold dore bar was mined. The AT system can be used to track gold as it moves from mine to refinery. The AT system may allow a mine to efficiently monetize dore without having to wait until the end of the refinement process. Although gold bar tokens and dore tokens share many characteristics of gold coin tokens, the AT system may operate differently when issuing, transferring ownerships, and redeeming gold bar tokens and dore tokens.

In some embodiments, the AT system supports the transfer of ownership of a whole or fractional ownership interest in a gold dore bar. Each gold dore bar is assigned a unique serial number that will be digitized and recorded on the shared ledger with a unique identifier. The value of the gold dore bar is determined by reference to the data provided by the mine regarding the expected gold content of the particular gold dore bar. As a result, the value of a dore token may different from the value of every other dore token. The gold dore bar underlying a dore token may not be stored in a depository, but rather may move through a standard process of refinement from the mine to the refinery.

In some embodiments, the AT system may not allow a dore token to be redeemed for the actual gold dore bar because gold dore bars are transitional industrial outputs that are intended to be further refined into gold. Instead, dore tokens may be redeemed for gold tokens in an amount equal to the actual (non-fungible) gold content ownership interest in the gold dore bar as recorded in the shared ledger after the gold dore bar has been refined. The refinery may record in the shared ledger a gold dore assay report for each refined gold dore bar.

Figure 2:
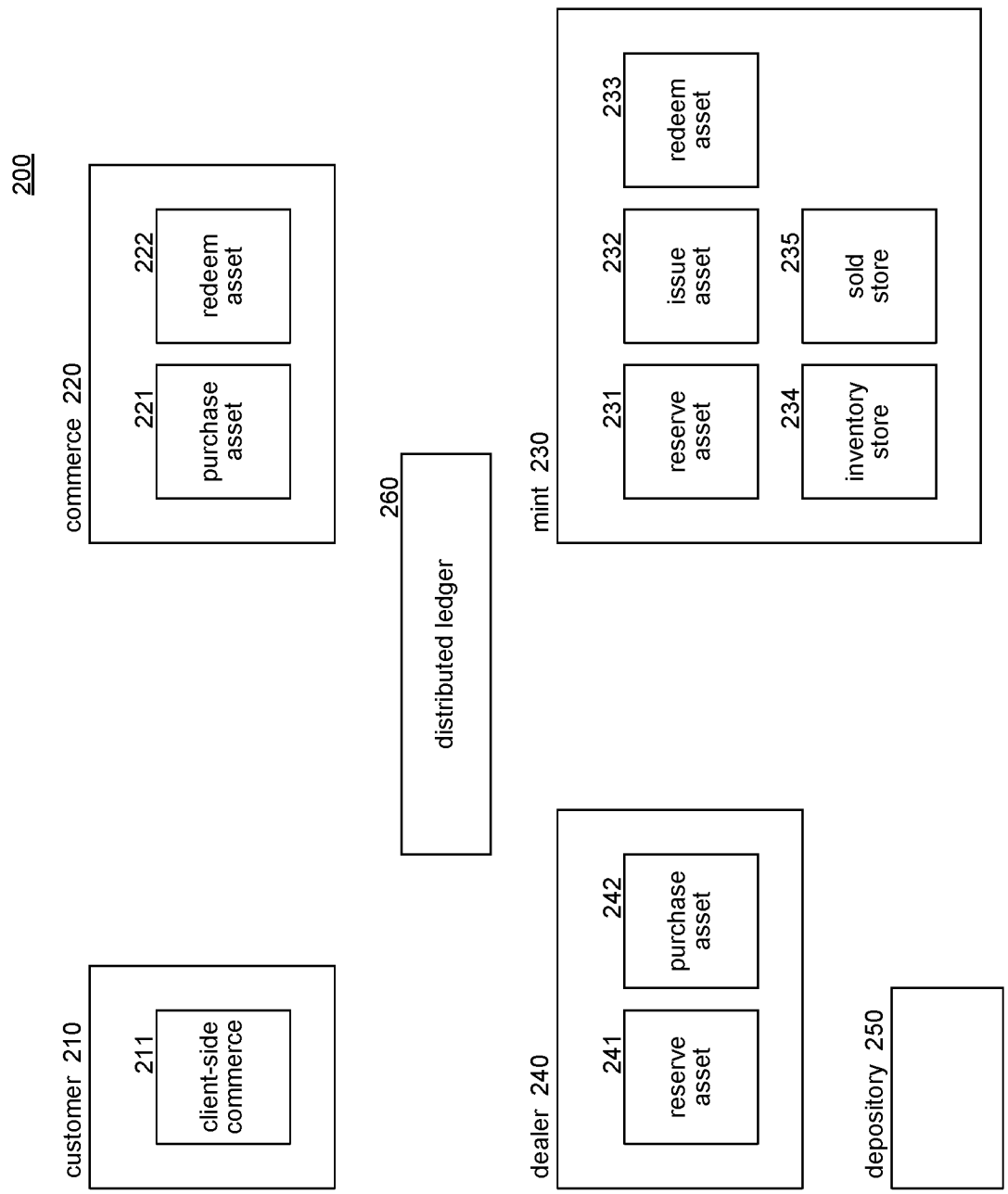
FIG. 2 is a block diagram illustrating components of the AT system in some embodiments.

FIG. 2 is a block diagram illustrating components of the AT system in some embodiments. An AT system 200 includes a customer component 210, a commerce component 220, a mint component 230, a dealer component 240, a depository component 250, and a distributed ledger 260. The customer component may include a client-side commerce component 211 that provides a user interface for interacting with the commerce component and may also provide a digital wallet for customers registered with the commerce component. The commerce component may include a purchase asset component 221 and a redeem asset component 222. The purchase asset component receives requests for purchase transactions for asset tokens from customer components and coordinates the selling of asset tokens to the customers. The redeem asset component receives requests for redemption transactions and coordinates the redeeming of asset tokens. The mint component includes a reserve asset component 231, an issue asset component 232, a redeem asset component 233, an inventory store 234, and a sold store 235. The reserve asset component receives requests for reserve transactions and coordinates the reserving of assets that are to back an asset token that is to be issued. The issue asset component receives requests for issue transactions and coordinates the issuing of asset tokens that are backed by reserved assets. The redeem asset component receives requests for redemption transactions and coordinates the redeeming of an asset token for the underlying assets. The inventory store may store an indication of inventory of the assets owned by the mint organization that are held at the depository. The sold store may store an indication of assets held in the depository that have been sold to purchasers of asset tokens. Alternatively, the inventory store and the sold store may be housed at the depository or may be implemented using the distributed ledger. The dealer component includes a reserve asset component 241 and a purchase asset component 242. The reserve asset component receives requests for reserve transactions from the mint component to reserve an asset that can be supplied by the dealer. The purchase asset component receives requests for purchase transactions from the mint component and coordinates the purchase of a reserved asset by the mint organization. The depository component may record information related to assets held at the depository. The information on the assets may be recorded in the distributed ledger. The distributed ledger or shared ledger represents a block chain for recording transactions related to asset tokens.

The computing systems and devices of the AT system may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the AT system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The AT system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the AT system may be implemented in hardware using, for example, an application-specific integrated circuit (ASIC) or field-programmable gate array ("FPGA").

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

The various embodiments of the AT system are described herein with reference to flow diagrams and/or block diagrams of methods, apparatus (systems), and computer program products. It will be understood that each block of the flow diagrams and/or block diagrams, and combinations of blocks in the flow diagrams and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

Figure 3:
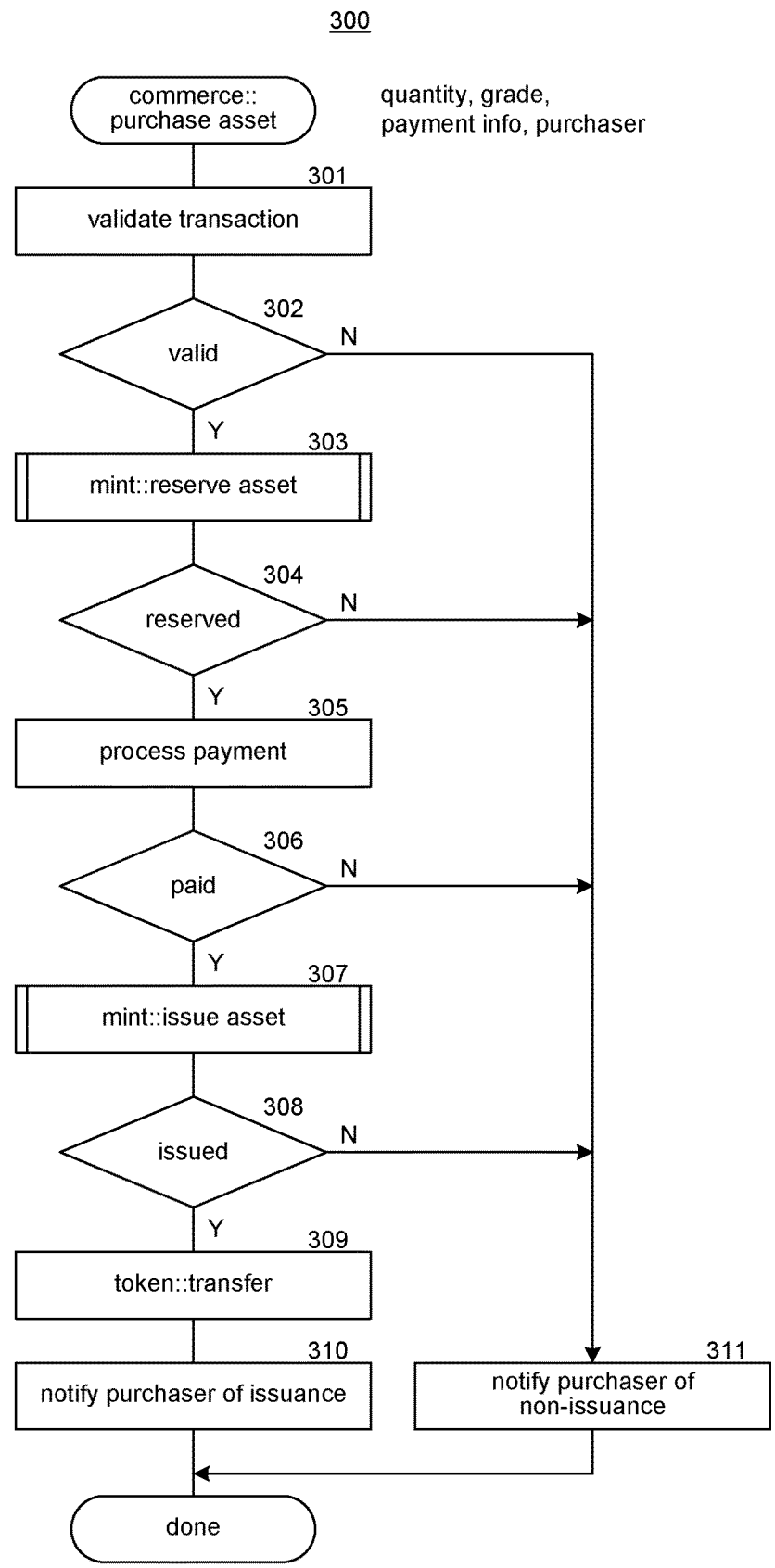
FIG. 3 is a flow diagram that illustrates processing of a purchase asset transaction component of the commerce component in some embodiments.

FIG. 3 is a flow diagram that illustrates processing of a purchase asset transaction component of the commerce component in some embodiments. A purchase asset transaction component 300 is invoked passing an indication of the quantity and quality of an asset to be purchased, payment information, and an identifier of a purchaser, which may be specified in a purchase order submitted by the purchaser. In block 301, the component validates the transaction. For example, the component may ensure that the purchaser is qualified to make the purchase, that the quantity and quality are valid, and so on. In decision block 302, if the transaction is valid, then the component continues at block 303, else the component continues at block 311. In block 303, the component submits a request to the mint component for a reserve asset transaction to reserve the asset in the specified quantity and quality. In decision block 304, if the mint component indicates that the asset has been reserved, then the component continues at block 305, else the component continues at block 311. The mint component may have recorded an asset token in the shared ledger with its state indicating that it is not yet issued and provided to the commerce component an identifier of the asset token. In block 305, the component processes the payment based on the payment information. For example, the payment information may specify an account from which funds are to be transferred. In decision block 306, if the payment has been made, then the component continues at block 307, else the component continues at block 311. In block 307, the component submits a request to the mint component for an issue asset transaction to issue an asset token backed by the reserved asset. The component may provide the identifier of the asset token to the mint component. In decision block 308, if the mint component indicates that the asset has been issued, then the component continues at block 309, else the component continues at block 311. In block 309, the component submits a request to the asset token for a transfer ownership transaction to transfer ownership of the asset token from the commerce organization to the purchaser. Alternatively, the mint component may issue the asset token in the name of the purchaser. In block 310, the component notifies the purchaser of the issuance and may direct the purchaser's wallet to be updated. In block 311, the component notifies the purchaser that the asset token was not issued. The component then completes.

Figure 4:
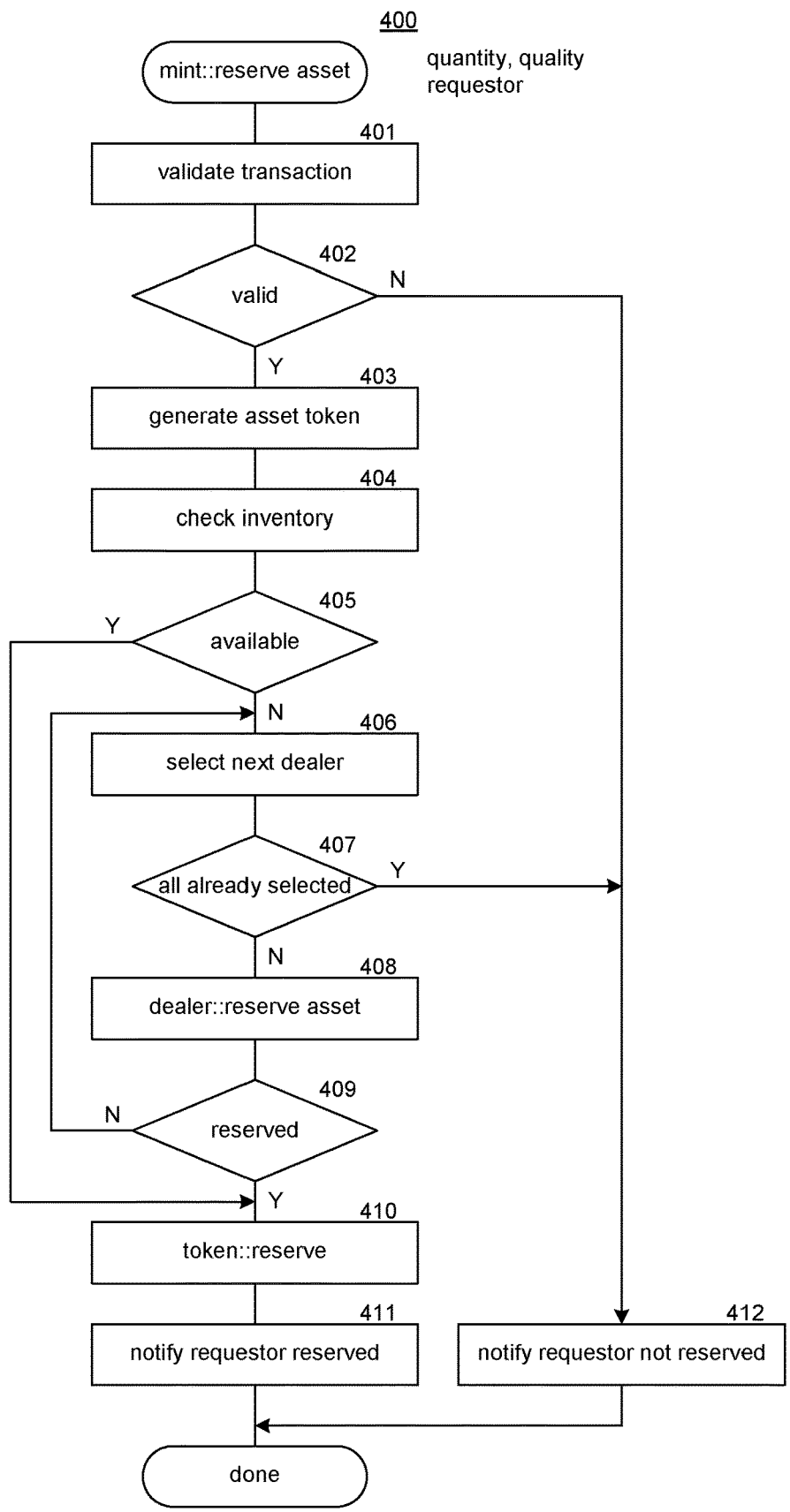
FIG. 4 is a flow diagram that illustrates processing of a reserve asset component of the mint component in some embodiments.

FIG. 4 is a flow diagram that illustrates processing of a reserve asset component of the mint component in some embodiments. A reserve asset component 400 is requested to perform a reserve transaction and is provided an indication of the quantity and quality of the asset to be reserved and an indication of the requester (i.e., the commerce organization). In block 401, the component validates the transaction, for example, by determining whether the requester is authorized to reserve assets. In decision block 402, if the transaction is valid, then the component continues at block 403, else the component continues at block 412. In block 403, the component generates an asset token. Alternatively, the generation of the asset token can be deferred until a later time. In block 404, the component checks the inventory of the mint organization (i.e., that is stored in the depository) to determine whether the requested quantity and quality of the asset is available to be reserved. In decision block 405, if the asset is available to be reserved, the component continues at block 410, else the component continues at block 406. In block 406, the component selects a next dealer who may be able to provide the asset. In decision block 407, if all the dealers have already been selected, then the component continues at block 412, else the component continues at block 408. In block 408, the component requests the dealer to perform a reserve asset transaction to reserve the needed asset. In decision block 409, if the dealer reserved the asset, the component continues at block 410, else the component loops to block 406 to select the next dealer. Although illustrated as being performed serially, the requests for a reserve transaction may be sent out in parallel to the dealers. In such a case, the component may select the first dealer to respond, may select who the dealer responds with the lowest price, and so on as the dealer whose reserved asset will be sold. The component may notify the dealers not selected to unreserve their assets or the dealers may automatically unreserve their assets after the expiration of a time in which the reserved asset was not purchased. In block 410, the component requests a reserve transaction of the asset token to indicate that the asset has been reserved for the asset token. In block 411, the component notifies the requester (e.g., commerce component) that the asset has been reserved. In block 412, the component notifies the requester that the asset has not been reserved. The component then completes.

Figure 5:
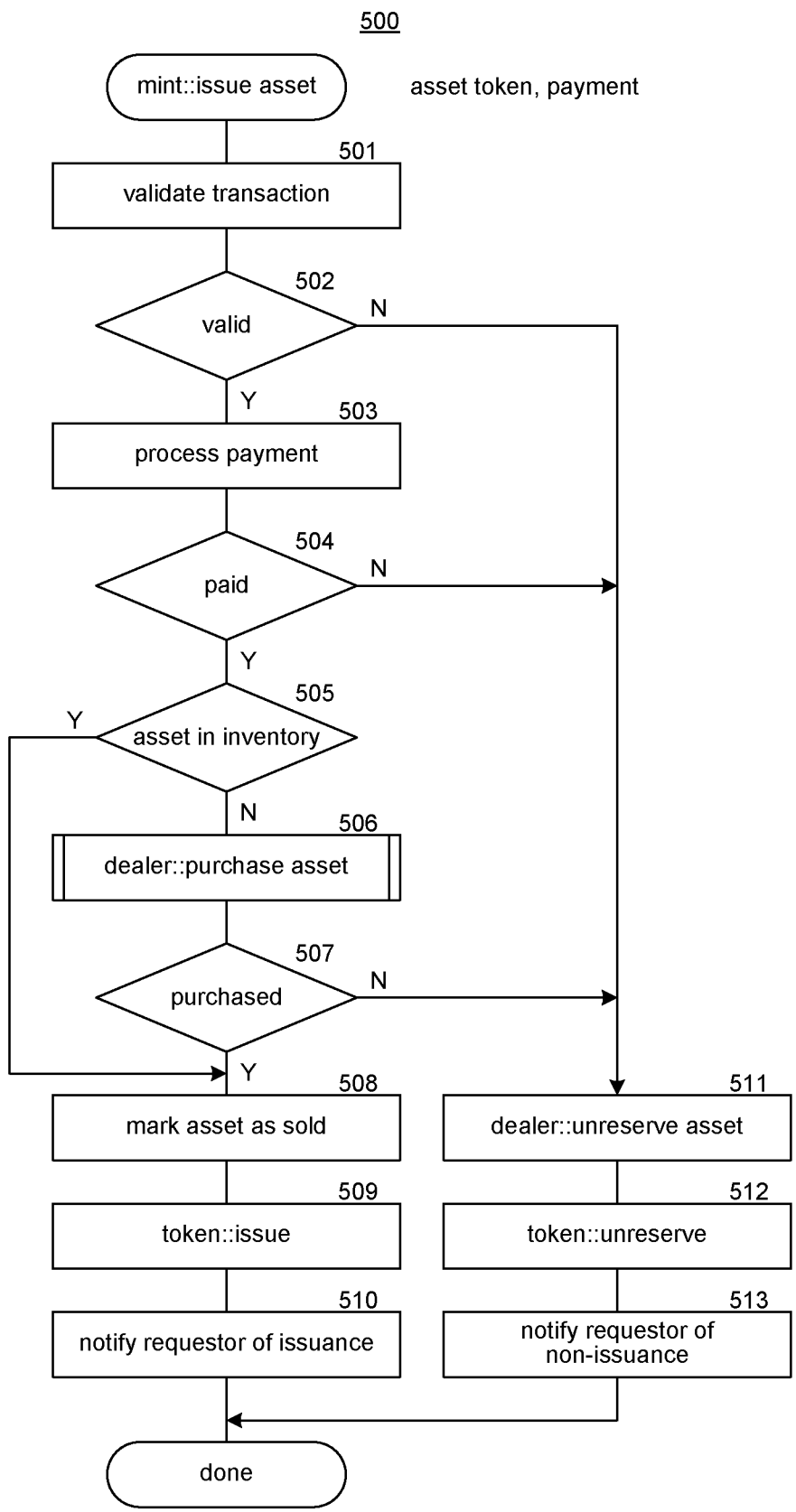
FIG. 5 is a flow diagram that illustrates processing of an issue asset component of the mint component in some embodiments.

FIG. 5 is a flow diagram that illustrates processing of an issue asset component of the mint component in some embodiments. An issue asset component 500 executes when a request for an issue asset transaction is received. The request may identify the asset token and payment information. In block 501, the component validates the transaction, for example, by ensuring that the asset token is available to be issued. In decision block 502, if the transaction is valid, then the component continues at block 503, else the component continues at block 511. In block 503, the component processes the payment information. In block 504, if the payment was made, then the component continues at block 505, else the component continues at block 511. In decision block 505, if the asset is in the inventory, for example, as indicated by the state of the asset token, then the component continues at block 508, else the component needs to affect the purchase of the asset and continues at block 506. In block 506, the component requests a purchase transaction of the dealer through which the asset was reserved. In decision block 507, if the purchase was successful, then the component continues at block 508, else the component continues at block 511. In block 508, the component marks the asset as sold, for example, with the depository. In block 509, the component requests an issue transaction of the asset token, for example, to issue the asset in the name of the commerce organization or the purchaser. In block 510, the component notifies the requester of the issuance. In block 511, the component may request an unreserve asset transaction of the dealer to release the asset because the asset token that is backed is not being issued. Alternatively, the reserving of an asset may have an associated expiration time. In such a case, the asset would automatically be released if the corresponding asset token was not issued. In block 512, the component may submit an unreserve transaction to the asset token to indicate that asset token will not be issued. In block 513, the component notifies the requester of the non-issuance. The component then completes.

Figure 6:
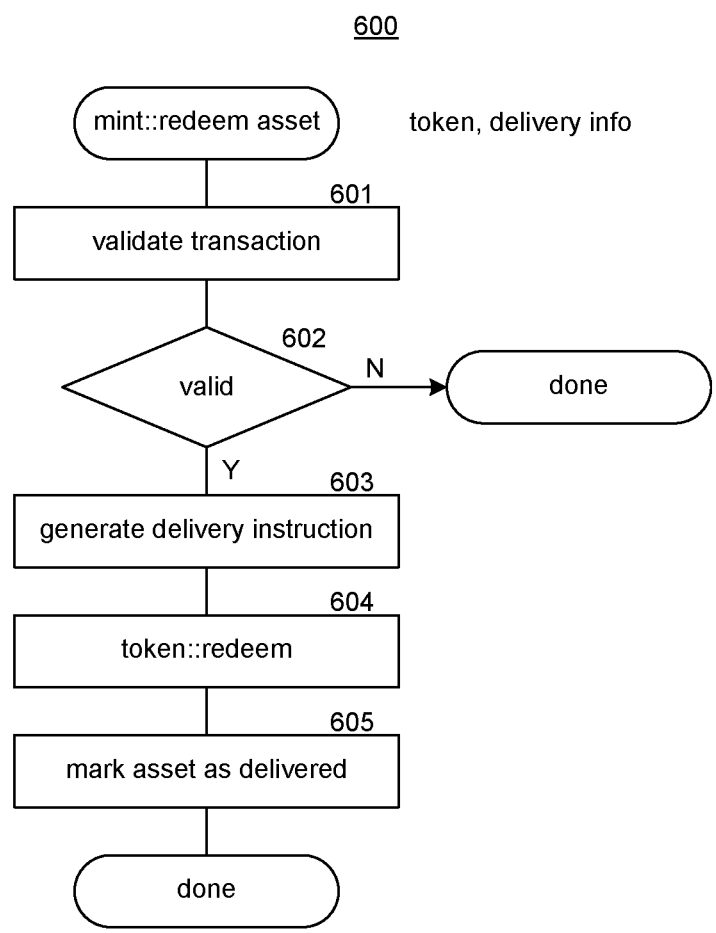
FIG. 6 is a flow diagram that illustrates processing of a redeem asset component of the mint component in some embodiments.

FIG. 6 is a flow diagram that illustrates processing of a redeem asset component of the mint component in some embodiments. A redeem asset component 600 is invoked to process a request for a redeem asset transaction and may be provided an indication of the asset token and delivery information. The component coordinates the delivery of the asset to the owner of the asset token and requests a redeem transaction for the asset token. In block 601, the component validates the transaction, for example, by ensuring that the asset token is issued to the requester and that the delivery can be made as requested. In decision block 602, if the transaction is valid, then the component continues at block 603, else the component completes. In block 603, the component generates delivery instructions, for example, that are provided to the depository. In block 604, the component requests a redeem transaction of the asset token to mark the asset token as having been redeemed. Alternatively, the depository may mark the asset token as redeemed when control of the asset is taken by the owner of the asset token. In block 605, the component may mark the asset as delivered and extinguish the asset token and then completes.

Figure 7:
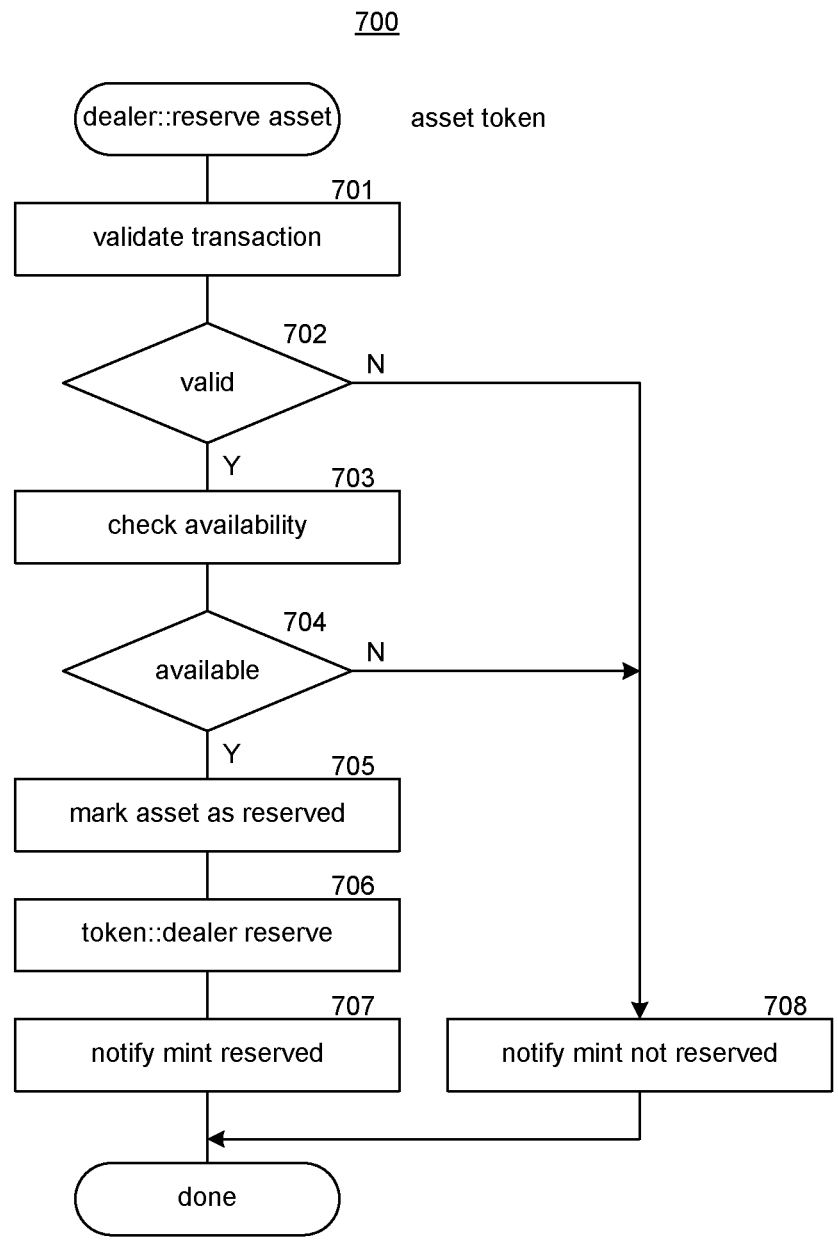
FIG. 7 is a flow diagram that illustrates the processing of a reserve asset component of a dealer component in some embodiments.

FIG. 7 is a flow diagram that illustrates the processing of a reserve asset is invoked to process a reserve asset transaction for a specified quantity and quality of an asset as indicated by an asset token. In block 701, the component validates the transaction, for example, by ensuring that the mint organization requesting the transaction is authorized to do so. In decision block 702, if the transaction is valid, then the component continues at block 703, else the component continues at block 708. In block 703, the component checks the availability of the asset in the requested quantity and quality. In decision block 704, if the asset is available, then the component continues at block 705, else the component continues at block 708. In block 705, the component marks the asset as reserved. In block 706, the component requests a dealer reserve transaction for the asset token to indicate that the dealer has reserved the asset for the asset token. Although not illustrated, if the dealer reserve transaction fails, then the component would continue at block 708. In block 707, the component notifies the mint component that the asset has been reserved. In block 708, the component notifies the mint organization that the asset has not been reserved. The component then completes.

Figure 8:
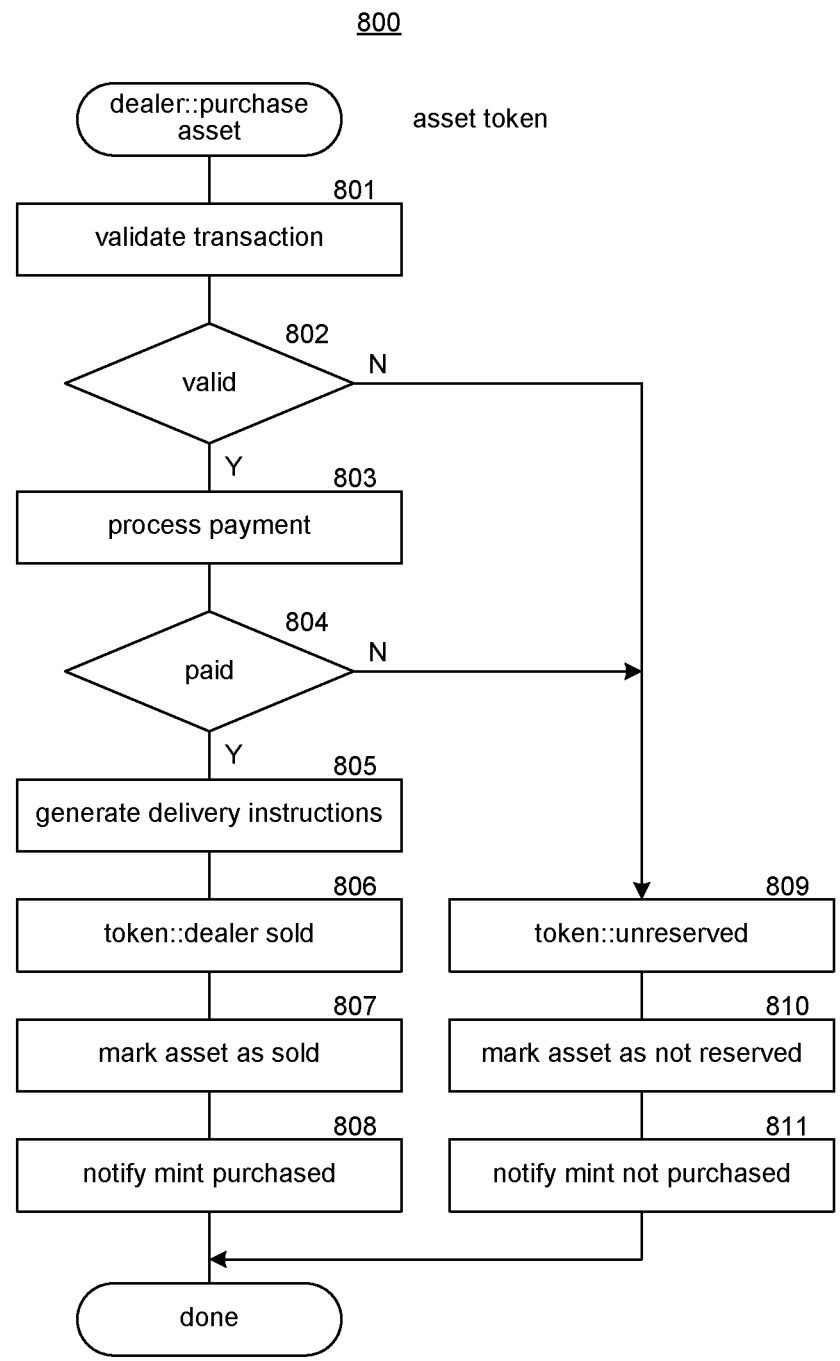
FIG. 8 is a flow diagram that illustrates processing of a purchase asset component of the dealer component in some embodiments.

FIG. 8 is a flow diagram that illustrates processing of a purchase asset component of the dealer component in some embodiments. A purchase asset component 800 is invoked when a request for a purchase asset transaction has been received. The request may identify the asset token. In block 801, the component validates the transaction, for example, by ensuring that the asset token indicates that the asset has been reserved by the dealer. In decision block 802, if the transaction is valid, then the component continues at block 803, else the component continues at block 809. In block 803, the component processes payment information that may be provided by the mint organization. In decision block 804, if the payment has been made, then the component continues at block 805, else the component continues at block 809. In block 805, the component may generate delivery instructions for delivering the asset to the depository. In block 806, the component requests a dealer sold transaction for the asset token to indicate that the asset backing the asset token has been sold to the mint component. In block 807, the component may mark the asset as sold. In block 808, the component notifies the mint component that the asset has been purchased. In block 809, the component may request an unreserve transaction of the asset token to indicate that the underlying asset is no longer reserved by the dealer. In block 810, the component marks the asset as not reserved. In block 811, the component notifies the mint component that the purchase was not successful. The component then completes.

The aforementioned flow and block diagrams illustrate the architecture, functionality, and operation of possible implementations of systems, methods, and computer program products according to various embodiments. In this regard, each block in the flow diagrams or block diagrams may represent a module, segment, or portion of code, which comprises one or more executable instructions for implementing the specified logical function or functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special-purpose hardware-based systems that perform the specified functions or acts, or combinations of special-purpose hardware and computer instructions.

Reference in the specification to "some embodiments," "an embodiment," "one embodiment," or "other embodiments" means that a particular feature, structure, or characteristic described in connection with the embodiments is included in at least some embodiments, but not necessarily all embodiments, of the AT system.

It is to be understood that the terms "including," "comprising," "consisting," and grammatical variants thereof do not preclude the addition of one or more components, features, steps, or integers, or groups thereof, and that the terms are to be construed as specifying components, features, steps, or integers.

We claim:

1. A method performed by a computing device for issuing an asset-backed asset token whose provenance can be tracked in a distributed ledger that is a blockchain, the method comprising:
receiving from a buyer a purchase order for an asset token, the purchase order specifying a quantity and quality of an asset that is to back the asset token;
reserving the asset by:
recording in the distributed ledger an asset token that identifies the quantity and quality of the asset and an issuer of the asset token as owner and that is associated with computer code of a smart contract that controls transferring ownership of the asset token by recording transactions to transfer ownership of the asset token in the distributed ledger, the owner identified based on a public key of a public/private key pair of the buyer;
confirming whether an inventory of assets includes sufficient assets to fulfill the quantity and quality of the asset specified in the purchase order for an asset token;
when the inventory does not include sufficient assets to fulfill the purchase order, acquiring and adding to the inventory assets so that the inventory includes sufficient assets to fill the purchase order; and
under control of the computer code of the smart contract, recording in the distributed ledger a reserve transaction for the asset token as reserved;
approving the purchase order;
receiving a payment for the asset token;
after receiving the payment, issuing the asset token to the buyer by:
creating an issue transaction that identifies the asset token, that is signed using a private key of a public/private key pair of the issuer, and that identifies the buyer as the owner based on a public key of a public/private key pair of the buyer;
recording ownership of the asset; and
under control of the computer code of the smart contract, recording the issue transaction that identifies the asset token in the distributed ledger;
wherein transactions to transfer the asset token that are recorded in the distributed ledger establish provenance of the asset including each owner of the asset.

2. The method of claim 1 further comprising:
receiving a purchase request to purchase the asset, the purchase request identifying the quantity and quality of the asset and a new owner;
identifying the asset token recorded in the distributed ledger as satisfying the purchase request; and
sending, to the computer code of the smart contract, a request to transfer ownership of the asset of the identified asset token to the new owner.

3. The method of claim 2 wherein the computer code of the smart contract executes to record a transfer transaction to transfer ownership from a current owner to a new owner, wherein the transfer transaction identifies the quantity and quality of the asset, is signed by a private key of a public/private key pair of the current owner, and identifies the new owner based on a public key of a public/private key pair of the new owner.

4. One or more computing systems for issuing an asset-backed asset token whose provenance can be tracked in a distributed ledger that is a blockchain, the one or more computing systems comprising:
one or more computer-readable storage mediums for storing computer-executable instructions for controlling the one or more computing systems to:
receive from a buyer a purchase order for an asset token, the purchase order specifying a quantity and quality of an asset that is to back the asset token;
reserve the asset by:
recording in the distributed ledger an asset token that identifies the quantity and quality of the asset and an issuer of the asset token as owner and that is associated with computer code of a smart contract that controls transferring ownership of the asset token by recording transfer transactions to transfer ownership of the asset token in the distributed ledger, the owner identified based on a public key of a public/private key pair of the buyer;
confirming whether an inventory of assets includes sufficient assets to fulfill the quantity and quality of the asset specified in the purchase order for an asset token;
when the inventory does not include sufficient assets to fulfill the purchase order, acquiring and adding to the inventory assets so that the inventory includes sufficient assets to fill the purchase order; and
under control of the computer code of the smart contract, recording in the distributed ledger a reserve transaction for the asset token as reserved;
approve the purchase order;
receive a payment for the asset token;
after receiving the payment, issue the asset token to the buyer by:
create an issue transaction that identifies the asset token, that is signed using a private key of a public/private key pair of the issuer, and that identifies the buyer as the owner based on a public key of a public/private key pair of the buyer;
record ownership of the asset; and
under control of the computer code of the smart contract, record the issue transaction that identifies the asset token in the distributed ledger;
wherein transactions to transfer the asset token that are recorded in the distributed ledger establish provenance of the asset including each owner of the asset; and one or more processors for executing the computer-executable instructions stored in the one or more computer-readable storage mediums.

5. The one or more computing systems of claim 4 wherein the instructions further:
receive a purchase request to purchase the asset, the purchase request identifying the quantity and quality of the asset and a new owner;
identify the asset token recorded in the distributed ledger as satisfying the purchase request; and
sending, to the computer code of the smart contract, a request to transfer ownership of the asset of the identified asset token to the new owner.

6. The one or more computing systems of claim 5 wherein the computer code of the smart contract executes to record a transfer transaction to transfer ownership from a current owner to a new owner, wherein the transfer transaction identifies the quantity and quality of the asset, is signed by a private key of a public/private key pair of the current owner, and identifies the new owner based on a public key of a public/private key pair of the new owner.

* * * * *

UNITED STATES PATENT AND TRADEMARK OFFICE
CERTIFICATE OF CORRECTION

PATENT NO.         : 10,657,595 B2
APPLICATION NO.    : 15/976763
DATED              : May 19, 2020
INVENTOR(S)        : Brent William de Jong et al.

Page 1 of 1

It is certified that error appears in the above-identified patent and that said Letters Patent is hereby corrected as shown below:

In the Specification

Column 6, Line 21, delete "("AMU")" and insert -- ("AML") --, therefor.

Column 7, Line 14, delete "necessary" and insert -- necessary. --, therefor.

Column 12, Line 6, after "asset" insert -- component of a dealer component in some embodiments. A reserve asset component 700 --.

Signed and Sealed this
Twenty-ninth Day of December, 2020

Andrei Iancu
*Director of the United States Patent and Trademark Office*